July 19, 1932.  E. GUNDERSEN ET AL  1,868,415

METHOD OF MANUFACTURING SCREWS WITH ONE OR TWO APPENDING WASHERS

Filed Oct. 17, 1930

Inventors
Einar Gundersen
and
Harald Lahn
By B. Singer, atty.

Patented July 19, 1932

1,868,415

UNITED STATES PATENT OFFICE

EINAR GUNDERSEN AND HARALD LAHN, OF OSLO, NORWAY

METHOD OF MANUFACTURING SCREWS WITH ONE OR TWO APPENDING WASHERS

Application filed October 17, 1930, Serial No. 489,398, and in Germany October 31, 1929.

In many cases it is desirable that screws be procurable provided with washers which are inseparable therefrom.

Heretofore in the manufacture of such screws the screw proper and the washer were made separately in two individual machines, the washer was put upon the screw stem and then by some step, such as by pressing or rolling the threads, secured against the possibility of being separated from the screw. Such manufacture was expensive, not only because of the separate formation of screw and washer but also because the putting-on of the washer was a work representing, in small screws, as much as 30% of the total costs. If in addition special steps are required to prevent the washer from falling from the stem, the costs may easily amount to several times the total costs for manufacturing the screw and the washer.

The present invention relates to a method, whereby a screw with a washer thereon may be manufactured at a price which is less than that of a screw and a washer separate therefrom and which secures the additional advantage that the washer is not liable to be separated from the screw and lost.

An example of carrying out the method in case the screw is made by turning is illustrated in the annexed drawing.

Figure 1:
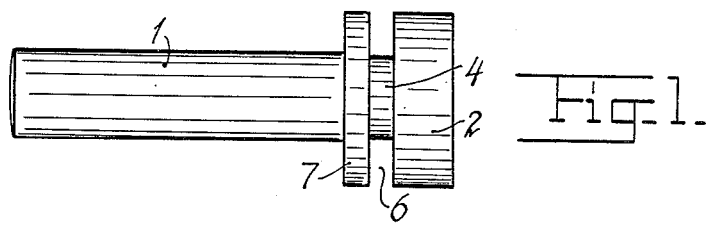
Fig. 1 shows the blank before the threads are cut but after a groove has been turned at the screw to form a collar, the said groove enabling a separation of the collar or washer material from the head.
Figure 2:
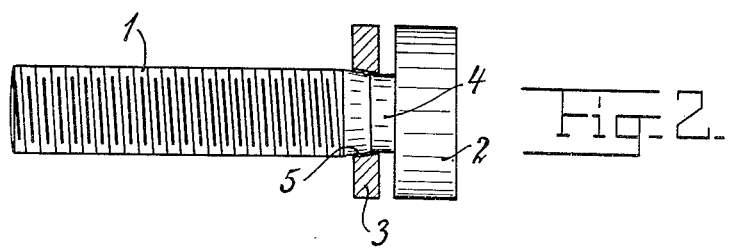
Fig. 2 shows the finished screw with a single washer separated from the head material, and unseparable from the stem, the washer being shown in section.

Referring to Figs. 1 and 2, the screw stem is denoted 1, the screw head 2 and the washer 3.

In accordance with our method the stem 1 is formed, together with the head 2. Then a groove 6 is turned close to the head 2, to form a collar 7, before the threads are cut. The groove 6 is preferably cut to a depth somewhat within the periphery of the stem. The stem 1 is provided with threads, and the screw-stock is caused to press axially against the collar 7 and thereby tear it loose from the screw material 1, so that the screw now has a turnable washer 3.

Simultaneously a threadless beard or frusto conical portion 5 (Fig. 2) is formed which will prevent the washer 3 from being removed from the screw stem. In screws of larger size a pointed axial groove may be turned at the stem at the left side of washer 3 as indicated at 8 in Fig. 4, so that the collar 7 is partly separated from the stem and the rest of the separation may be effected by axial pressure.

The collar need not be bodily separated from the stem. It may also be separated only partly although substantially, so that the final separation takes place at the use of the screw.

Figure 5:
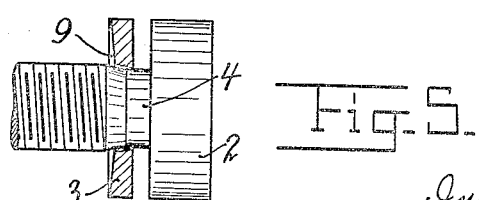
Fig. 5 shows a modification.

In some cases it may be suitable to make the washer somewhat tapering inwardly on the side facing away from the head 2 as shown at 9 in Fig. 5, so that the thickness of the washer will be somewhat reduced at the centre. In such case the washer will be resilient. This shape may be obtained by turning the part 7 correspondingly at the left simultaneously with the stem 1 being turned.

Figure 3:
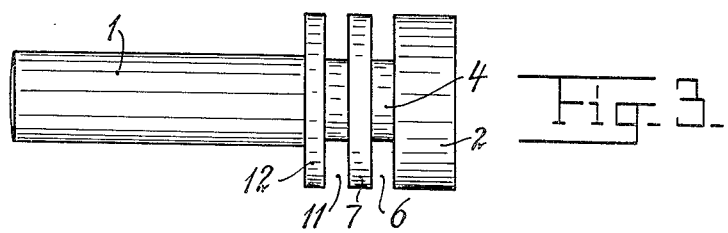
Figs. 3 and 4 are views corresponding to Figs. 1 and 2 respectively but showing the manufacturing of a screw with two washers.
Figure 4:
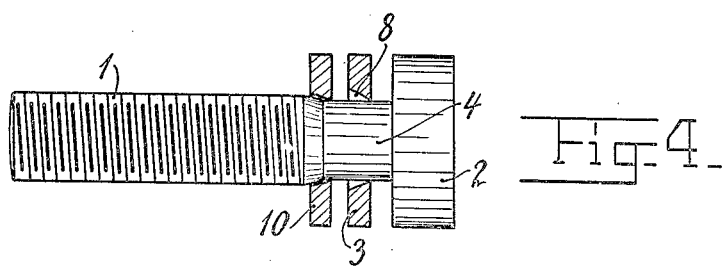

Finally, two washers 3 and 10 may be made on the same stem 1 as shown in Fig. 4. This is useful in electrical connecting screws. In this case two grooves 6 and 11 of about the same depth are turned (Fig. 3) so that two collars or washer blanks 7 and 12 are formed side by side and may be separated from the stem by axial pressure, the inner (right hand) one 7 only partly, if desired.

The grooves 6, 11 may also be made by pressing instead of turning, and also the threads may be made by pressing or rolling. In all cases the washer material is subjected to a suitable axial pressure.

I claim:

1. The method of making a screw having a washer thereon, consisting in forming the stem of the screw with a surrounding collar integral therewith and then separating the collar from the stem to form a washer.

2. The method of making a screw having a head and also having a washer inseparable from the screw, consisting in forming the stem of the screw with a surrounding collar integral therewith and near the head, reducing the diameter of the screw stem at the point between the collar and the head and then separating the collar from the stem so that it becomes movable toward and from the head and on the diametrically reduced portion of the stem.

3. The method of manufacturing a screw with a washer, consisting in forming the screw with a collar on and integral with the screw stem and then separating the collar from the stem so as to form the washer in position on the stem.

4. The method of making a screw having a washer, consisting in forming the stem of the screw with an integral collar, reducing the diameter of the screw stem at the point contiguous to and at the outer side of the collar and then cutting the collar from the stem in an inclined line converging toward the outer end of the stem so as to form a frusto conical shoulder on the stem and a correspondingly shaped opening in the collar, thereby converting the collar into a washer movable on the stem and inseparable therefrom.

In witness whereof we affix our signatures.

EINAR GUNDERSEN.
HARALD LAHN.